US012566109B2

(12) United States Patent
Guo et al.

(10) Patent No.: US 12,566,109 B2
(45) Date of Patent: Mar. 3, 2026

(54) CONTROL METHOD FOR HEAT DISSIPATION VERIFICATION DEVICE, HEAT DISSIPATION VERIFICATION DEVICE AND SYSTEM

(71) Applicant: Shenzhen Fulian Fugui Precision Industry Co., Ltd., Shenzhen (CN)

(72) Inventors: Li-Wen Guo, Shenzhen (CN); Ke-Feng You, Shenzhen (CN); Zhi-Yu Deng, Shenzhen (CN)

(73) Assignee: Shenzhen Fulian Fugui Precision Industry Co., Ltd., Shenzhen (CN)

( * ) Notice: Subject to any disclaimer, the term of this patent is extended or adjusted under 35 U.S.C. 154(b) by 493 days.

(21) Appl. No.: 18/218,619

(22) Filed: Jul. 6, 2023

(65) Prior Publication Data

US 2024/0410793 A1 Dec. 12, 2024

(30) Foreign Application Priority Data

Jun. 12, 2023 (CN) .......................... 202310696485.1

(51) Int. Cl.
*G01M 99/00* (2011.01)

(52) U.S. Cl.
CPC ................................. *G01M 99/002* (2013.01)

(58) Field of Classification Search
CPC ........ G01M 99/002; Y02D 10/00; G06F 1/20; G06F 11/3058
USPC .......................................................... 374/43
See application file for complete search history.

(56) References Cited

U.S. PATENT DOCUMENTS

| | | | | |
|---|---|---|---|---|
| 10,612,980 | B2 * | 4/2020 | Jurski | G01K 3/08 |
| 11,256,312 | B2 * | 2/2022 | Hu | G06F 1/30 |
| 2002/0015287 | A1 * | 2/2002 | Shao | H05K 7/20727 361/695 |
| 2007/0188198 | A1 * | 8/2007 | Bird | G06F 1/263 327/63 |
| 2016/0274629 | A1 * | 9/2016 | Lovicott | G06F 1/206 |
| 2018/0210724 | A1 * | 7/2018 | Su | G06F 8/65 |
| 2021/0333850 | A1 * | 10/2021 | Chang | G05B 19/4155 |
| 2021/0410336 | A1 * | 12/2021 | Yao | H05K 7/20736 |
| 2022/0295675 | A1 * | 9/2022 | Katayama | B60L 58/26 |
| 2023/0334184 | A1 * | 10/2023 | Zhang | G06F 21/83 |
| 2023/0413220 | A1 * | 12/2023 | Zhang | H04W 64/003 |

FOREIGN PATENT DOCUMENTS

| | | | | |
|---|---|---|---|---|
| CN | 101833295 A | | 9/2010 | |
| CN | 111026611 A | * | 4/2020 | G06F 1/20 |

* cited by examiner

*Primary Examiner* — Peter J Macchiarolo
*Assistant Examiner* — Mireille S Sadate-Moualeu
(74) *Attorney, Agent, or Firm* — ScienBiziP, P.C.

(57) ABSTRACT

A control method for heat dissipation verification device, a heat dissipation verification device and system are provided, the heat dissipation verification device comprising a base-board management controller (BMC), a temperature detecting module, a switch module, and a heating module; the control method includes generating a driving signal according to a verification instruction by the BMC after receiving the verification instruction; transmitting the driving signal to the switch module by the BMC, driving the heating module to output a target power by the switch module; and obtaining temperature data from the temperature detecting module and obtaining a heat dissipation verification result of the target liquid cooling system according to the temperature data by the BMC.

18 Claims, 7 Drawing Sheets

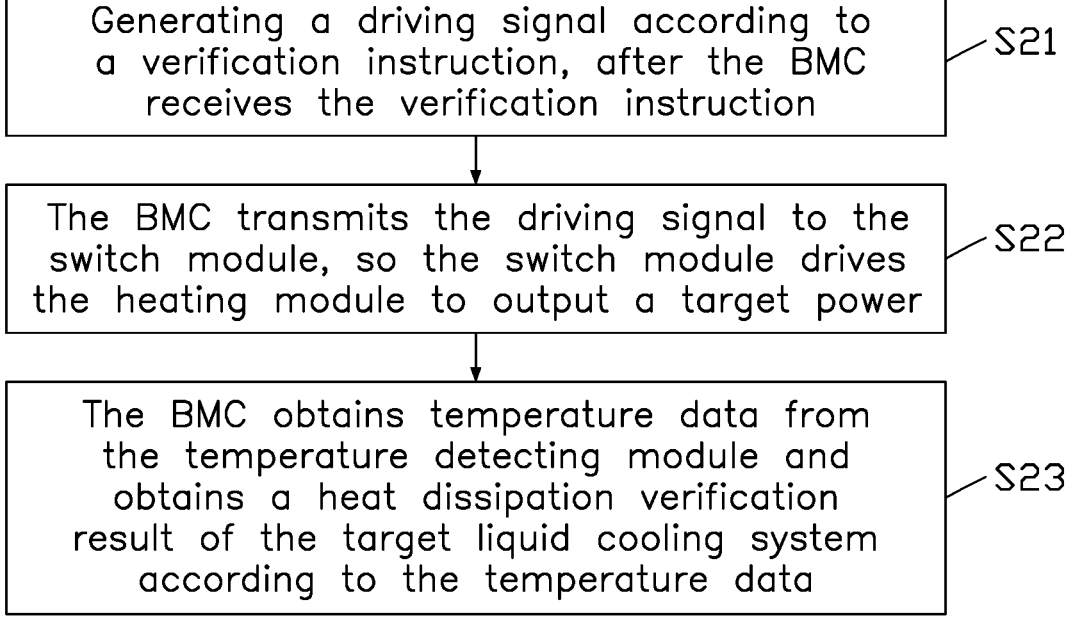

Generating a driving signal according to a verification instruction, after the BMC receives the verification instruction — S21

The BMC transmits the driving signal to the switch module, so the switch module drives the heating module to output a target power — S22

The BMC obtains temperature data from the temperature detecting module and obtains a heat dissipation verification result of the target liquid cooling system according to the temperature data — S23

FIG. 2

Determining a target conductive frequency and a target duty ratio according to the target power ⟋S21

Generating the driving signal according to the target conductive frequency and the target duty ⟋S22

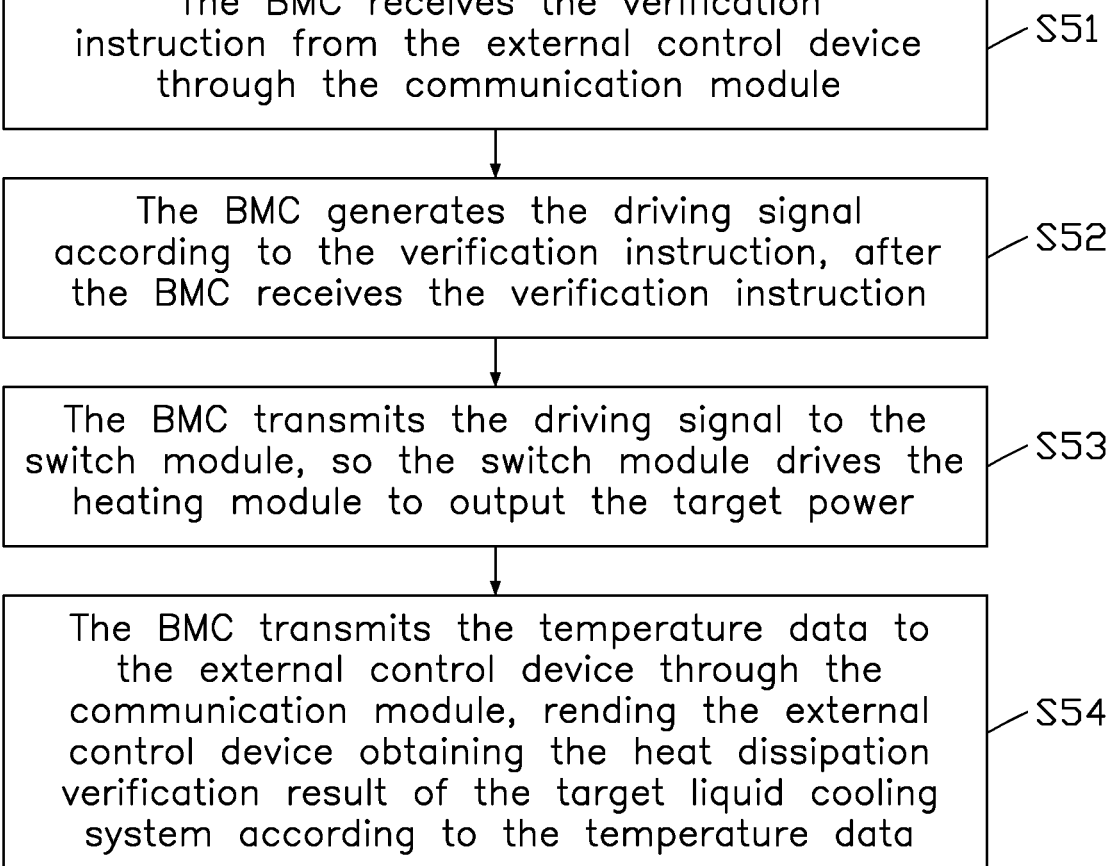

The BMC receives the verification instruction from the external control device through the communication module — S51

The BMC generates the driving signal according to the verification instruction, after the BMC receives the verification instruction — S52

The BMC transmits the driving signal to the switch module, so the switch module drives the heating module to output the target power — S53

The BMC transmits the temperature data to the external control device through the communication module, rending the external control device obtaining the heat dissipation verification result of the target liquid cooling system according to the temperature data — S54

FIG. 5

CONTROL METHOD FOR HEAT DISSIPATION VERIFICATION DEVICE, HEAT DISSIPATION VERIFICATION DEVICE AND SYSTEM

CROSS-REFERENCE TO RELATED APPLICATIONS

This application claims priority to Chinese Patent Application No. 202310696485.1 filed on Jun. 12, 2023, in China National Intellectual Property Administration, the contents of which are incorporated by reference herein.

FIELD

The subject matter herein generally relates to apparatus heat dissipation technologies, and specially relates to a control method for heat dissipation verification device, a heat dissipation verification device and system.

BACKGROUND

In the relative art, the liquid cooling system is formed by cabinets of servers and liquid cooling recursive devices, during a test verification process of the liquid cooling system, manually arranging a heat source in the liquid cooling system, after activating the liquid cooling system, detecting whether the temperature of the liquid cooling system is greater than an upper limit value, so as to determine whether the liquid cooling system is qualified.

However, in the test verification process of the liquid cooling system, a heating power dissipation of the heat source cannot be precisely controlled, a heat status of the server cannot be correctly simulated, so a reliability of the verification result is low.

BRIEF DESCRIPTION OF THE DRAWINGS

Implementations of the present disclosure will now be described, by way of example only, with reference to the attached figures.

FIG. 2 is a flow chart of an embodiment of a control method for the heat dissipation verification device according to the present application.

FIG. 5 is another flow chart of an embodiment of the method for generating driving signal according to the present application.

DETAILED DESCRIPTION

Figure 1:
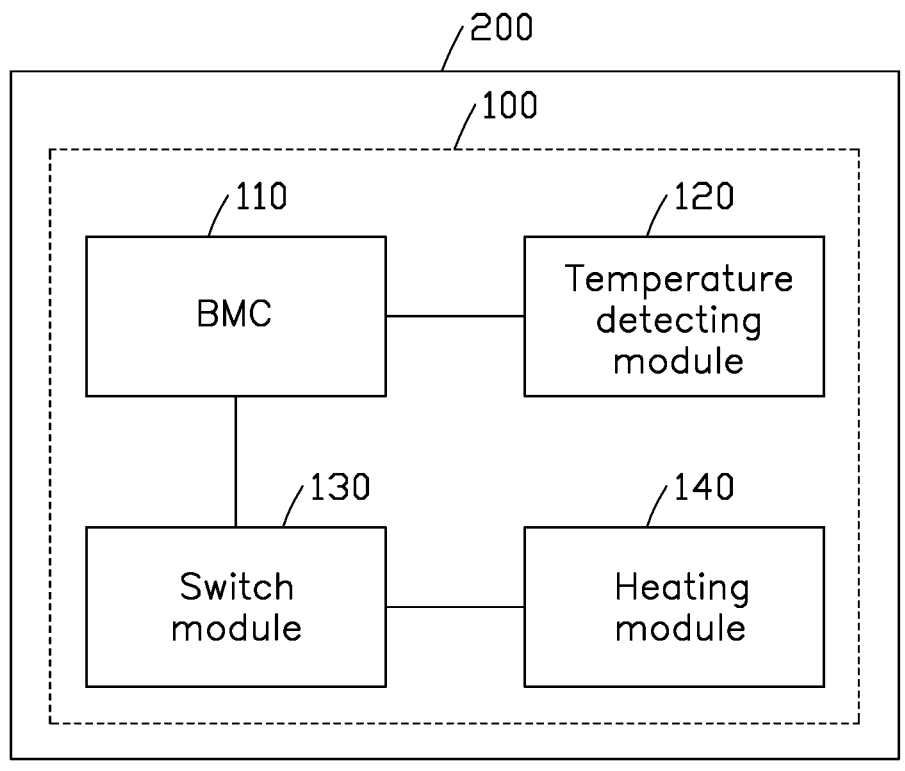
FIG. 1 is a schematic diagram of an embodiment of a heat dissipation verification device according to the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better show details and features of the present disclosure.

Several definitions that apply throughout this disclosure will now be presented.

The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but may have one or more deviations from a true cylinder. The term "comprising," when utilized, means "including, but not necessarily limited to"; it specifically indicates open-ended inclusion or membership in the so-described combination, group, series, and the like.

With the developing of servers, power dissipation of the servers is increasing, causing the heat generated by the servers increases accordingly, traditional air cooling heat dissipation may no longer meet the heat dissipation of the servers requirements, liquid cooling system is normally used for the servers.

In the relative art, the liquid cooling system is formed by cabinets of servers and liquid cooling recursive devices, during a test verification process of the liquid cooling system, manually arranging a heat source in the liquid cooling system, after activating the liquid cooling system, detecting whether the temperature of the liquid cooling system is greater than an upper limit value, so as to determine whether the liquid cooling system is qualified. However, in the test verification process of the liquid cooling system, a heating power dissipation of the heat source cannot be precisely controlled, a heat status of the server cannot be correctly simulated, so a reliability of the verification result is low.

A control method for heat dissipation verification device, a heat dissipation verification device and system are provided, which are configured to precisely control a heat power dissipation of a heating module, so as to currently simulate a heating status of servers, and to improve a reliability of a verification result of the heat dissipation verification system.

FIG. 1 illustrates a schematic diagram of an embodiment of a heat dissipation verification device 100. The heat dissipation verification device 100 is arranged in a target liquid cooling system 200. The heat dissipation verification device 100 includes a baseboard management controller (BMC) 110, a temperature detecting module 120, a switch module 130, and a heating module 140.

The temperature detecting module 120 is connected to the BMC 110. The switch module 130 is connected to the BMC 110 and the heating module 140.

FIG. 2 illustrates a flow chart of an embodiment of a control method for the heat dissipation verification device 100 as shown in FIG. 1. The control method may include:

At block S21, generating a driving signal according to a verification instruction, after the BMC receives the verification instruction.

In at least one embodiment, the verification instruction may be transmitted to the BMC by an external control device. The external control device may include, but not limited to, a personal computer, a tablet computer, and a mobile phone. The external control device may establish communication with the heat dissipation verification device, that is, the external control device may establish communication with the BMC, for instance, the external control device may be connected to the BMC through signal cables and establish communication with the BMC.

The verification instruction may contain a heating power dissipation. The BMC generates a corresponding driving signal according to the heating power dissipation, so the heating module can output a same heating power dissipation. For instance, the heating power dissipation of the server to be simulated is 5 kilowatts, the BMC generates a corresponding driving signal according to the heating power dissipation.

At block S22, the BMC transmits the driving signal to the switch module, so the switch module drives the heating module to output a target power.

In at least one embodiment, the BMC may be connected to a control end of the switch module, the switch module may further include a first end and a second end, the first end is configured to receive supply electric power, the second end is configured to output electric power to the heating module. After the switch module receives the driving signal, the switch module may adjust the electric power outputted to the heating module according to the driving signal, so as to control the target power outputted by the heating module, that is controlling the heating module to reach the heating power dissipation for the simulation.

At block S23, the BMC obtains temperature data from the temperature detecting module and obtains a heat dissipation verification result of the target liquid cooling system according to the temperature data.

The BMC controlled the heating module to output the target power according to the driving signal, controlled the heating module to reach the heating power dissipation for the simulation in the target liquid cooling system, that is the temperature detecting module obtained the temperature data in the target liquid cooling system to verify whether the heat dissipation function of the target liquid cooling system is qualified according to the temperature data, so as to obtain corresponding heat dissipation verification result. In at least one embodiment, the temperature detecting module includes, but not limited to, various kinds of temperature sensors.

In at least one embodiment, the heat dissipation verification device includes the BMC, the temperature detecting module, the switch module, and the heating module, when applying detecting verification to the target liquid cooling system, the BMC generates the driving signal according to the verification instruction, and transmits the driving signal to the switch module, the switch module drives the heating module according to the driving signal, so the heating module output the target power, the heating module reaches the heating power dissipation for the simulation, that is the heat dissipation verification device may correctly simulate a heating status of the servers, so as to improve a reliability of a heat dissipation verification result of obtained by the BMC.

In at least one embodiment, the switch module includes at least one Metal-Oxide-Semiconductor Field-Effect Transistor (MOSFET), the heating module includes at least one heating resistor. The MOSFET includes the control end, the first end, and the second end. The control end of the MOSFET is connected to the BMC, the first end of the MOSFET is configured to receive supply electric power, the second end of the MOSFET is connected to the corresponding heating resistor. The step of the BMC transmitting the driving signal to the switch module includes: outputting the driving signal to at least one MOSFET, the MOSFET outputs a target voltage to the corresponding heating resistor according to the driving signal.

It should be known that, arranging a plurality of MOSFET and corresponding heating resistors, so a greater adjustable range of the target power of the heat dissipation verification device can be obtained, that is a greater adjustable range of the heating power dissipation of the heat dissipation verification device can be obtained, so the heat dissipation verification device can simulate the heating status of various servers.

Figure 3:
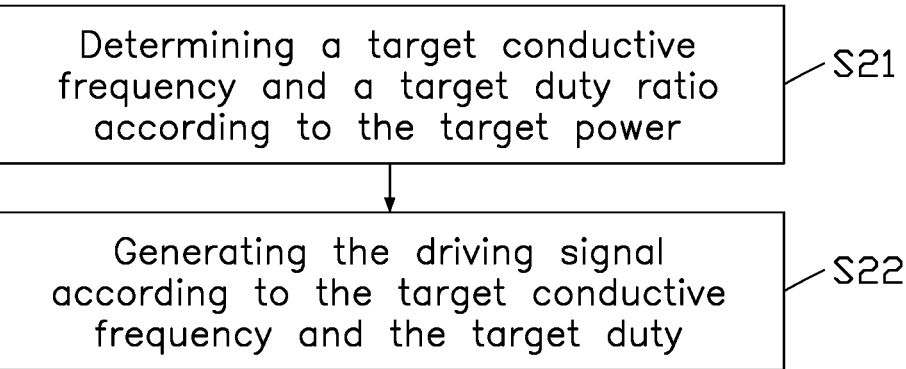
FIG. 3 is a flow chart of an embodiment of a method for generating driving signal according to the present application.

In at least one embodiment, the verification instruction may include the target power, referring to FIG. 3, generating the driving signal according to the verification instruction may include:

At block S31, determining a target conductive frequency and a target duty ratio according to the target power.

In at least one embodiment, the BMC may extract the target power of the heating module from the verification instruction, and determine the target conductive frequency and the target duty ratio of the switch module according to the target power.

At block S32, generating the driving signal according to the target conductive frequency and the target duty ratio.

The driving signal may include, but not limited to, a pulse width modulation (PWM) signal, the target conductive frequency may be a frequency of the PWM signal, the target duty ratio may be a duty ratio of the PWM signal.

Figure 4:
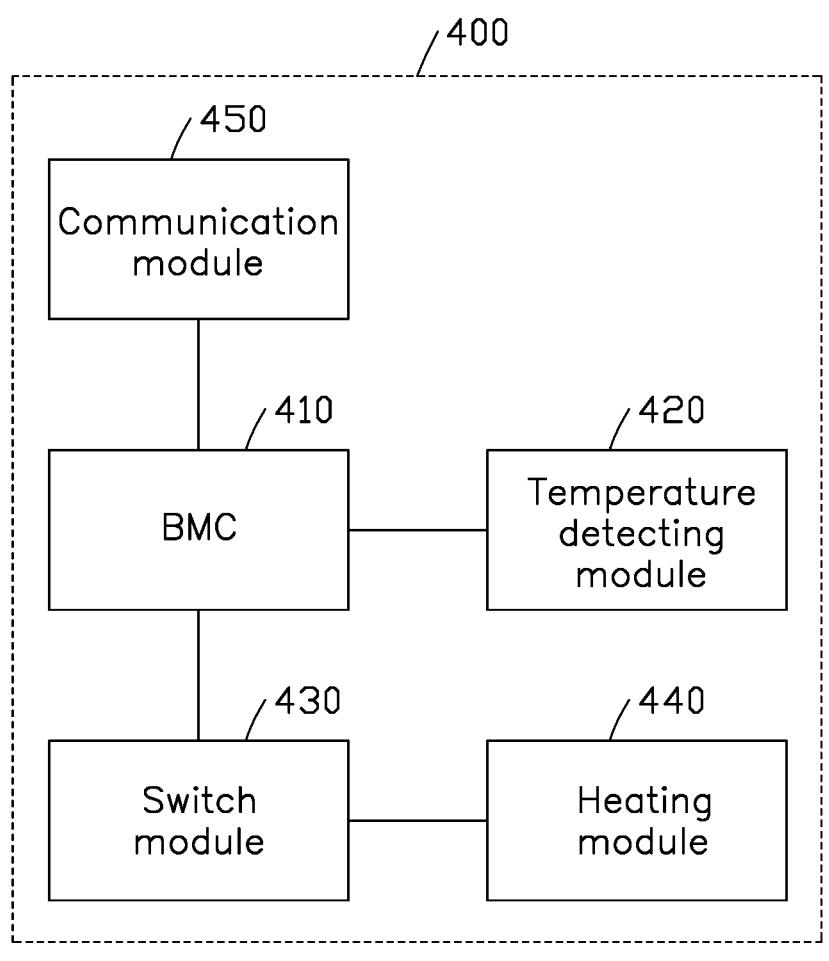
FIG. 4 is another schematic diagram of an embodiment of the heat dissipation verification device according to the present application.

FIG. 4 illustrates another schematic diagram of an embodiment of the heat dissipation verification device 400 according to the present disclosure. Comparing the heat dissipation verification device 400 to the heat dissipation verification device 100, the heat dissipation verification device 400 further includes a communication module 450. The communication module 450 is connected to the BMC 410.

Referring to FIG. 5, in a scene as shown in FIG. 4, the control method includes:

At block S51, the BMC receives the verification instruction from the external control device through the communication module.

In at least one embodiment, the communication module may be connected to the external control device by signal cables for receiving the verification instruction from the external control device, the communication module further forwards the verification instruction to the BMC. In another embodiment, the communication module may be a wireless communication module.

At block S52, the BMC generates the driving signal according to the verification instruction, after the BMC receives the verification instruction.

At block S53, the BMC transmits the driving signal to the switch module, so the switch module drives the heating module to output the target power.

Blocks S52-S53 may be referred to blocks S21-S22, which are not repeated here.

At block S54, the BMC transmits the temperature data to the external control device through the communication module, rending the external control device obtaining the heat dissipation verification result of the target liquid cooling system according to the temperature data.

Figure 6:
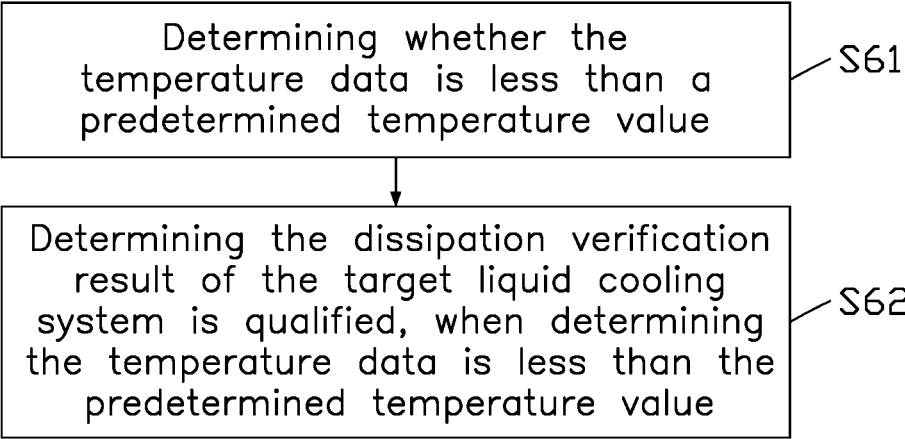
FIG. 6 is a flow chart of an embodiment of a method for obtaining heat dissipation verification result according to the present application.

Referring to FIG. 6, in the block S23, obtaining the heat dissipation verification result of the target liquid cooling system according to the temperature data, further includes:

At block S61, determining whether the temperature data is less than a predetermined temperature value.

At block S62, determining the dissipation verification result of the target liquid cooling system is qualified, when determining the temperature data is less than the predetermined temperature value.

In at least one embodiment, the BMC may pre-store the predetermined temperature value, the BMC may further transmit the dissipation verification result to the external control device.

The present disclosure provides the heat dissipation verification device arranged in the target liquid cooling system. The heat dissipation verification device includes the BMC, the temperature detecting module, the switch module, and the heating module. The temperature detecting module is connected to the BMC. The switch module is connected to the BMC and the heating module.

The BMC is configured to generate the driving signal according to the verification instruction after receiving the verification instruction, and transmit the driving signal to the switch module. The switch module is configured to drive the heating module to output the target power. The temperature detecting module is configured to obtain the temperature data of the target liquid cooling system. The BMC is further configured to obtain the temperature data from the temperature detecting module and obtain the heat dissipation verification result of the target liquid cooling system according to the temperature data.

In at least one embodiment, the heat dissipation verification device further includes the communication module. The communication module is connected to the BMC. The BMC is further configured to receive the verification instruction from the external control device through the communication module. The BMC is further configured to transmit the temperature data to the external control device through the communication module, rending the external control device obtaining the heat dissipation verification result of the target liquid cooling system according to the temperature data.

Beneficial effects of the heat dissipation verification device may be referred to beneficial effects of the control method for the heat dissipation verification device described above, not repeating here.

Figure 7:
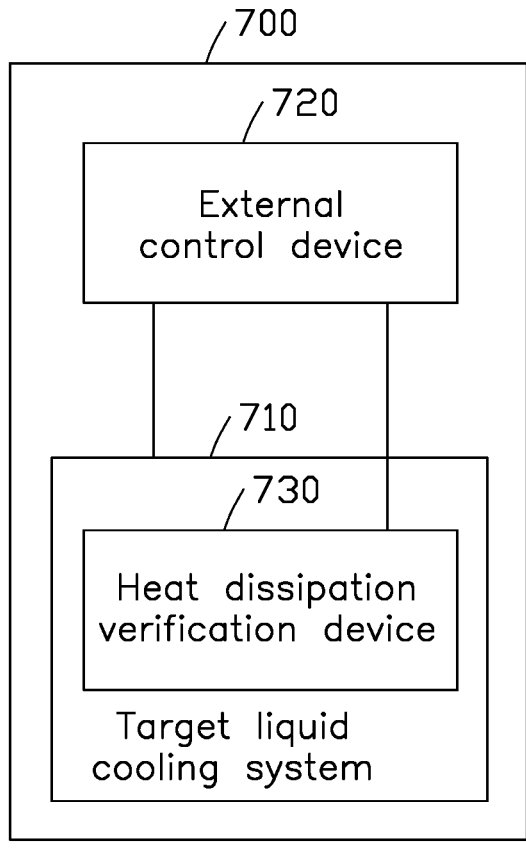
FIG. 7 is a schematic diagram of an embodiment of a heat dissipation verification system according to the present application.

FIG. 7 illustrates a schematic diagram of an embodiment of a heat dissipation verification system 700 according to the present disclosure. The heat dissipation verification system 700 includes a target liquid cooling system 710, an external control device 720, and a heat dissipation verification device 730.

In at least one embodiment, the external control device 720 is configured to transmit an activate instruction to the target liquid cooling system 710 and transmit the verification instruction to the heat dissipation verification device 730. The heat dissipation verification device 730 is configured to receive the verification instruction and execute the control method for the heat dissipation verification device described in any embodiments above.

Beneficial effects of the heat dissipation verification system may be referred to beneficial effects of the control method for the heat dissipation verification device described above, not repeating here.

A non-transitory computer-readable storage medium including program instructions for causing the computer apparatus (such as personal computer, device, or network device, etc.) or the processor to perform the control method for the heat dissipation verification device is also disclosed.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A control method for a heat dissipation verification device, the heat dissipation verification device arranged in a target liquid cooling system, the heat dissipation verification device is provided with a baseboard management controller (BMC), a temperature detecting module, a switch module, and a heating module; the temperature detecting module connected to the BMC, the switch module connected to the BMC and the heating module; the control method comprising:

generating a driving signal according to a verification instruction by the BMC after receiving the verification instruction;

transmitting the driving signal to the switch module by the BMC, driving the heating module to output a target power by the switch module; and obtaining temperature data from the temperature detecting module and obtaining a heat dissipation verification result of the target liquid cooling system according to the obtained temperature data by the BMC.

2. The control method of claim 1, wherein the verification instruction is provided with the target power, generating the driving signal according to the verification instruction by the BMC after receiving the verification instruction further comprises:

determining a target conductive frequency and a target duty ratio according to the target power, and generating the driving signal according to the target conductive frequency and the target duty ratio.

3. The control method of claim 1, wherein the switch module is provided with at least one Metal-Oxide-Semiconductor Field-Effect Transistor (MOSFET), the heating module is provided with at least one heating resistor, the at least one MOSFET is provided with a control end, a first end, and a second end, the control end of the at least one MOSFET is connected to the BMC, the first end of the at least one MOSFET is configured to receive supply electric power, the second end of the at least one MOSFET is connected to a corresponding heating resistor, transmitting the driving signal to the switch module by the BMC further comprises:

outputting the driving signal to the at least one MOSFET by the BMC, outputting a target voltage to the corresponding heating resistor according to the driving signal by the at least one MOS.

4. The control method of claim 1, wherein the heat dissipation verification device is further provided with a communication module, the communication module is connected to the BMC, the control method further comprises:

receiving the verification instruction from an external control device through the communication module.

5. The control method of claim 4, further comprising:

transmitting the temperature data to the external control device through the communication module by the BMC, rending the external control device obtaining a heat dissipation verification result of the target liquid cooling system according to the obtained temperature data.

6. The control method of claim 1, wherein obtaining the heat dissipation verification result of the target liquid cooling system according to the obtained temperature data further comprises:

determining whether the temperature data is less than a predetermined temperature value, and determining the heat dissipation verification result of the target liquid cooling system is qualified, when determining the temperature data is less than the predetermined temperature value.

7. A heat dissipation verification device arranged in a target liquid cooling system, the heat dissipation verification device comprising a baseboard management controller (BMC), a temperature detecting module, a switch module, and a heating module; the temperature detecting module connected to the BMC, the switch module connected to the BMC and the heating module;

the BMC is configured to generate a driving signal according to a verification instruction after receiving the verification instruction, and transmit the driving signal to the switch module;

the switch module is configured to drive the heating module to output a target power;

the temperature detecting module is configured to obtain temperature data of the target liquid cooling system; and the BMC is further configured to obtain the temperature data from the temperature detecting module and obtain a heat dissipation verification result of the target liquid cooling system according to the temperature data.

8. The heat dissipation verification device of claim 7, further comprising a communication module, wherein the communication module is connected to the BMC, and the BMC is further configured to receive the verification instruction from an external control device through the communication module.

9. The heat dissipation verification device of claim 8, wherein the BMC is further configured to transmit the temperature data to the external control device through the communication module, rending the external control device obtaining the heat dissipation verification result of the target liquid cooling system according to the temperature data.

10. The heat dissipation verification device of claim 7, wherein the BMC is further configured to determine a target conductive frequency and a target duty ratio according to the target power, and generate the driving signal according to the target conductive frequency and the target duty ratio.

11. The heat dissipation verification device of claim 7, wherein the switch module comprises at least one Metal-Oxide-Semiconductor Field-Effect Transistor (MOSFET), the heating module comprises at least one heating resistor, the at least one MOSFET comprises a control end, a first end, and a second end, the control end of the at least one MOSFET is connected to the BMC, the first end of the at least one MOSFET is configured to receive supply electric power, the second end of the at least one MOSFET is connected to a corresponding heating resistor;

the BMC is further configured to output the driving signal to the at least one MOSFET, the at least one MOSFET is configured to output a target voltage to the corresponding heating resistor according to the driving signal.

12. The heat dissipation verification device of claim 7, wherein the BMC is further configured to:

determine whether the temperature data is less than a predetermined temperature value, and determine the heat dissipation verification result of the target liquid cooling system is qualified, when determining the temperature data is less than the predetermined temperature value.

13. A heat dissipation verification system comprising:

a target liquid cooling system to be verified;

an external control device configured to transmit an activate instruction to the target liquid cooling system, and transmit a verification instruction; and a heat dissipation verification device configured to receive the verification instruction, the heat dissipation verification device comprising a baseboard management controller (BMC), a temperature detecting module, a switch module, and a heating module; the temperature detecting module connected to the BMC, the switch module connected to the BMC and the heating module;

the BMC is configured to generate a driving signal according to a verification instruction after receiving the verification instruction, and transmit the driving signal to the switch module;

the switch module is configured to drive the heating module to output a target power;

the temperature detecting module is configured to obtain temperature data of the target liquid cooling system; and the BMC is further configured to obtain the temperature data from the temperature detecting module and obtain a heat dissipation verification result of the target liquid cooling system according to the temperature data.

14. The heat dissipation verification system of claim 13, wherein the heat dissipation verification device further comprises a communication module, the communication module is connected to the BMC, and the BMC is further configured to receive the verification instruction from the external control device through the communication module.

15. The heat dissipation verification system of claim 14, wherein the BMC is further configured to transmit the temperature data to the external control device through the communication module, rending the external control device obtaining the heat dissipation verification result of the target liquid cooling system according to the temperature data.

16. The heat dissipation verification system of claim 13, wherein the BMC is further configured to
   determine a target conductive frequency and a target duty ratio according to the target power, and
   generate the driving signal according to the target conductive frequency and the target duty ratio.

17. The heat dissipation verification system of claim 13, wherein the switch module comprises at least one Metal-Oxide-Semiconductor Field-Effect Transistor (MOSFET), the heating module comprises at least one heating resistor, the at least one MOSFET comprises a control end, a first end, and a second end, the control end of the at least one MOSFET is connected to the BMC, the first end of the at least one MOSFET is configured to receive supply electric power, the second end of the at least one MOSFET is connected to a corresponding heating resistor;
   the BMC is further configured to output the driving signal to the at least one MOSFET, the at least one MOSFET is configured to output a target voltage to the corresponding heating resistor according to the driving signal.

18. The heat dissipation verification system of claim 13, wherein the BMC is further configured to:
   determine whether the temperature data is less than a predetermined temperature value, and
   determine the heat dissipation verification result of the target liquid cooling system is qualified, when determining the temperature data is less than the predetermined temperature value.

* * * * *